US010242176B1

(12) United States Patent
Sathyanarayana et al.

(10) Patent No.: US 10,242,176 B1
(45) Date of Patent: Mar. 26, 2019

(54) CONTROLLED ACCESS COMMUNICATION BETWEEN A BASEBOARD MANAGEMENT CONTROLLER AND PCI ENDPOINTS

(71) Applicant: Cisco Technology, Inc., San Jose, CA (US)

(72) Inventors: Kiran Bangalore Sathyanarayana, Bangalore (IN); Rajaganesh Rathinasabapathi, Bangalore (IN); Sriranjan Bose, Bangalore (IN)

(73) Assignee: Cisco Technology, Inc., San Jose, CA (US)

( * ) Notice: Subject to any disclaimer, the term of this patent is extended or adjusted under 35 U.S.C. 154(b) by 243 days.

(21) Appl. No.: 15/407,383

(22) Filed: Jan. 17, 2017

(51) Int. Cl.
*G06F 13/36* (2006.01)
*G06F 21/44* (2013.01)
*G06F 13/42* (2006.01)

(52) U.S. Cl.
CPC .............. *G06F 21/44* (2013.01); *G06F 13/36* (2013.01); *G06F 13/42* (2013.01)

(58) Field of Classification Search
None
See application file for complete search history.

(56) References Cited

U.S. PATENT DOCUMENTS

| 8,904,079 | B2 | 12/2014 | Chang et al. | |
| 9,411,762 | B2 | 8/2016 | Natu et al. | |
| 9,652,388 | B2* | 5/2017 | Shanbhogue | G06F 12/0808 |
| 2007/0250710 | A1* | 10/2007 | Thibadeau | H04L 9/0838 |
| | | | | 713/168 |
| 2012/0047309 | A1* | 2/2012 | Natu | H04L 63/101 |
| | | | | 710/314 |
| 2014/0068275 | A1* | 3/2014 | Swanson | G06F 21/57 |
| | | | | 713/192 |
| 2015/0215343 | A1 | 7/2015 | Itkin et al. | |

(Continued)

OTHER PUBLICATIONS

"MCTP over PCI Express Access Control Extensions", Revision 0.7, Oct. 2015, intel, 20 pages.

(Continued)

*Primary Examiner* — Fatoumata Traore
(74) *Attorney, Agent, or Firm* — Edell, Shapiro & Finnan, LLC

(57) ABSTRACT

A computing device includes a bus controller and an endpoint device that are in communication over an internal bus. The bus controller initiates a discovery message to the endpoint device requesting a computational value based on the discovery message, wherein the computational value is generated by the endpoint device using a predefined algorithm and the discovery message includes a preconfigured identification code associated with the bus controller. The bus controller receives a response from the endpoint device, which includes the computational value, when the endpoint device authenticates the controller based on the preconfigured identification code. If the bus controller successfully authenticates the endpoint device based on the computational value, the controller sends an acknowledgment message to the endpoint device and registers it as being owned by the bus controller. Otherwise, the bus controller sends a failure message to the endpoint device and logs it as being unmanageable by the controller.

20 Claims, 15 Drawing Sheets

(56) References Cited

U.S. PATENT DOCUMENTS

2016/0248619 A1    8/2016  Itkin

OTHER PUBLICATIONS

P. Onufryk et al., "NVMe™ and PCIe SSDs NVMe™ Management Interface", Flash Memory Summit 2014, Santa Clara, CA, nvm Express, Aug. 2014, 26 pages.
P. Onufryk et al., "NVM Express Management Interface", NVM Express Management Interface 1.0, Revision 1.0, Nov. 17, 2015, 96 pages.
"Management Component Transport Protocol (MCTP) Overview", White Paper, Version 1.0.0a, Jul. 2007, DSP2016, Distributed Management Task Force, Inc. (DMTF), 15 pages.
"Management Component Transport Protocol (MCTP) PCIe VDM Transport Binding Specification", DSP0238, Version 1.0.1, Dec. 11, 2009, Distributed Management Task Force, Inc., 19 pages.
"Management Component Transport Protocol Base Specification", Includes MCTP Control Command Specifications, DSP0236, Version 1.1.0, Apr. 22, 2010, Distributed Management Task Force, Inc., 82 pages.

\* cited by examiner

| MESSAGE TYPE | MESSAGE TYPE CODE | DESCRIPTION |
|---|---|---|
| MCTP CONTROL MESSAGE | 0x00 | CONTROL MESSAGES USED FOR MCTP INITIALIZATION, DISCOVERY BY MCTP BUS OWNERS |
| PLATFORM LEVEL DATA | 0x01 | MCTP DATA MESSAGE |
| NC-SI OVER MCTP | 0x02 | RESERVED FOR NC-SI OVER MCTP MESSAGES |
| VENDOR DEFINED - PCI | 0x7E | MESSAGE TYPE USED TO SUPPORT VDMs WHERE THE VENDOR IS IDENTIFIED USING A PCI-BASED VENDOR ID. MESSAGE TYPE USED TO DEFINE SPECIFIC FUNCTIONALITIES BY THE VENDOR |
| VENDOR DEFINED - IANA | 0x7F | MESSAGE TYPE USED TO SUPPORT VDMs WHERE THE VENDOR IS IDENTIFIED USING AN IANA-BASED VENDOR ID. MESSAGE TYPE USED TO DEFINE SPECIFIC FUNCTIONALITIES BY THE VENDOR |

FIG.5

| | BYTE | DESCRIPTION |
|---|---|---|
| REQUEST DATA | 1-2: VENDOR ID | PCI VENDOR ID 0x1137 |
| | 3: HASH VERSION AND DATA<br>• [4-7] VERSION<br>• [0-3] HASH VALUE | 'VERSION' SELECTS THE HASH ALGORITHMS TO BE USED.<br>'HASH VALUE' IS A PARAMETER TO BE PASSED IN HASH FUNCTION |
| | 4-19 CHALLENGE STRING | 16-BYTE RANDOM INPUT DATA |

FIG. 8A

| DATA RESPONSE | BYTE | DESCRIPTION |
|---|---|---|
| | 1-2: VENDOR ID | PCI VENDOR ID 0x1137 |
| | 3-18: "16-BYTE" CHALLENGE RESPONSE | THE HASHED OUTPUT OF REQUEST DATA USING ALGORITHM SELECTED USING THE 'VERSION' FIELD |

FIG. 8B

| | BYTE | DESCRIPTION |
|---|---|---|
| REQUEST DATA | 1-2: VENDOR ID | PCI VENDOR ID 0x1137 |
| | 3-18: STATUS | STATUS IS A HASH OF SAME ALGORITHM USED IN PREVIOUS "CHALLENGE" STEP WITH AN INPUT STRING FORMED AS BELOW.<br>• TOTAL LENGTH OF INPUT STRING IS 16-BYTE<br>• FIRST 15-BYTES ARE TAKEN FROM THE CHALLENGE-RESPONSE SENT BY END-POINT IN PREVIOUS STEP<br>• 16th BYTE IS ACTUAL STATUS AS BELOW<br>  • 0x00- HANDSHAKE SUCCESS<br>  • 0X0F- HANDSHAKE FAILURE<br>• DATA SENT IS HASH_FUNCTION("CHALLENGE_RESPONSE[0-14]", "0x0X") |

FIG.9A

| RESPONSE DATA | BYTE | DESCRIPTION |
|---|---|---|
| | 1-2: VENDOR ID | PCI VENDOR ID 0x1137 |
| | 3: COMPLETION CODE | 0x00 - B/D/F FILTER APPLIED<br>0x00 IS SENT BY ENDPOINT IF, "STATUS" STRING IS SAME AS<br>· HASH_FUNCTION("CHALLENGE_RESPONSE[0-14]", "0x00")<br>ANY OTHER COMPLETION CODE WILL BE TREATED BY DRIVER AS "UNMANAGE ENDPOINT" AND WILL NOT BE PART OF MCTP NETWORK. |

CONTROLLED ACCESS COMMUNICATION BETWEEN A BASEBOARD MANAGEMENT CONTROLLER AND PCI ENDPOINTS

TECHNICAL FIELD

The present disclosure relates to maintaining security of operations performed in a computing device.

BACKGROUND

The number of endpoint devices in, or connected to, computing devices has recently increased dramatically. Endpoint devices may be used to control and measure parameters within a computing device such as fan speed, memory configuration and voltage settings. Unfortunately, as the number of functions controlled by these devices increases, so too does the associated security threat. For example, a malicious party may take over an internal bus and attempt to issue unauthorized commands to one or more of the endpoint devices, damaging, or possibly destroying, the computing device itself. In certain deployments, such as government and financial networks, for example, such threats may lead to costly damages, or worse. However, preventing a malicious party from issuing unauthorized commands over an internal bus can be difficult, particularly if the malicious party has gained control of one or more of endpoint devices that are connected to the bus.

BRIEF DESCRIPTION OF THE DRAWINGS

FIG. 5 is a diagram of the message codes included in a Management Component Transport Protocol packet, according to an example embodiment.

FIG. 8A is a diagram of a challenge request packet sent by a controller to an endpoint device in the bus management system, according to an example embodiment.

FIG. 8B is a diagram of a challenge response packet sent by an endpoint device to a controller in the bus management system, according to an example embodiment.

FIG. 9A is a diagram of a success message packet sent by a controller to an endpoint device in the bus management system, according to an example embodiment.

FIG. 9B is a diagram of a completion code packet sent by an endpoint device to a controller in the bus management system, according to an example embodiment.

DESCRIPTION OF EXAMPLE EMBODIMENTS

Overview

In accordance with one embodiment, a computing device includes a bus controller and an endpoint device that are in communication over an internal bus. The bus controller initiates a discovery message to the endpoint device requesting a computational value based on the discovery message, wherein the computational value is generated by the endpoint device using a predefined algorithm and the discovery message includes a preconfigured identification code associated with the bus controller. The bus controller receives from the endpoint device a response that includes the computational value, when the endpoint device authenticates the controller based on the preconfigured identification code. If the bus controller successfully authenticates the endpoint device based on the computational value, the bus controller sends an acknowledgment message to the endpoint device and registers it as being "owned" by the controller. Otherwise, if the bus controller does not successfully authenticate the endpoint device, the bus controller sends a failure message to the endpoint device and logs it as being unmanageable by the bus controller.

EXAMPLE EMBODIMENTS

Figure 1:
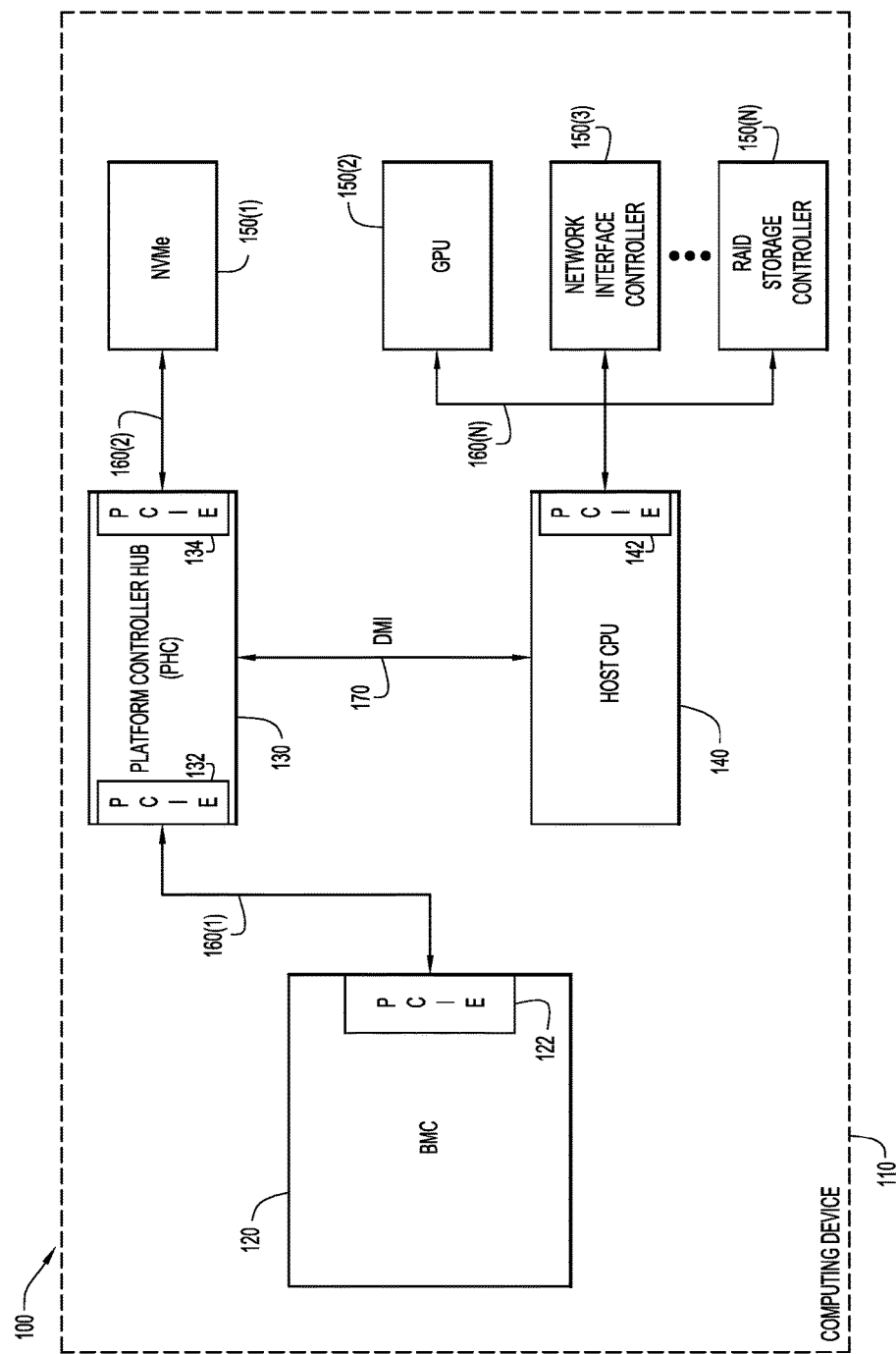
FIG. 1 is a high-level diagram illustrating a bus management system in which control commands of a computing device are monitored to prevent an unauthorized controller from gaining control of an internal bus of the computing device, according to an example embodiment.

With reference first to FIG. 1, there is depicted a block diagram of a bus management system 100 that includes a computing device 110 comprising a baseboard management controller ("BMC") 120, a platform controller hub ("PCH") 130, one or more host processors 140, and one or more endpoint devices 150(1)-150(N). Computing device 110 further includes internal buses 160(1)-160(N) that connect the BMC to the one or more endpoint devices 150(1)-150(N), via PCH 130. The one or more endpoint devices 150(1)-150(N) may take the form of non-volatile memory express (NVMe) interface shown at 150(1), a graphics processor unit ("GPU"), shown at 150(2), a network interface controller shown at 150(3), and a redundant array of independent disks ("RAID") controller shown at 150(N), as examples, or may be any mechanism that may receive control communications from BMC 120. For example, the network interface controller 150(3) may be a standard interface that enables network communications, such as wired or wireless network communications.

The PCH 130 may control the data paths between BMC 120 and one or more endpoint devices 150(1)-150(N), and provide support functionality to host processor 140, including, but not limited to, a system clock and interface 170, enabling PCH 130 to communicate with host processor 140. For example, PCH 130 may receive, via interface 132, one or more commands sent from BMC 120 over bus 160(1) and forward the one or more commands to NVME 150(1) over bus 160(2), via interface 134. PCH 130 may further receive, via interface 170, communications from host processor 140, including data from one or more endpoints 150(1)-150(N), and forward the data to BMC 120 over bus 160(1).

The one or more host processors 140 may be a microprocessor or a microcontroller. It should be understood, however, that processor 140 may be any component and/or device configured to send or receive commands and/or data via interface 142 and interface 170. According to an embodiment, the interface 142 may be a Peripheral Component Interface Express ("PCIe") and interface 170 may be a Direct Media Interface ("DMI"). According to an embodiment, host processor 140 may receive, via interface 170, one or more commands and/or data issued from BMC 120 and forward, via interface 142, the one or more commands and/or data to one or more endpoints 150(1)-150(N) over bus 160(N).

It should be further understood that BMC 120 may be any suitable programmable device, such as an application specific integrated circuit ("ASIC"), a field-programmable gate array ("FPGA"), or any such device, including a solid-state device having Read-Only Memory ("ROM"), that is configured to issue one or more commands and/or data over internal bus 160(N) to one or more endpoint devices 150(2)-150(N). Accordingly, BMC 120 may be any component or device that is configured to initiate, over an internal bus 160(N), an authentication mechanism to authenticate and configure one or more endpoint devices 150(2)-150(N).

According to an embodiment, buses 160(1), 160(2) and 160(3) may be a Peripheral Communication Interface ("PCI") bus, a PCIe bus, a Controller Area Network ("CAN") bus, a Joint Test Action Group ("JTAG") bus, an ACCESS bus, a System Management bus (SMBus), a Power Management bus (PMBus) and/or an Intelligent Platform Management bus (IPMB).

As discussed in greater detail below, computing device 110 may be a stand-alone computer or a server running one or more applications responsible for controlling the operations in one or more computing devices 110. Computing device 110 may further be a wired or wireless communication device and may operate in accordance with any communication/network technology, including, but not limited to, Ethernet, Wi-Fi®, Bluetooth®, 4G or LTE, etc. In still another example, the computing device 110 may be a network device, such as a router, switch, firewall, gateway, etc. Endpoint devices 150(1)-150(N) may be any device that performs and/or controls various functions and/or devices and each is responsive to commands received from processor BMC 120 via bus 160(2) or host processor via bus 160(N). An endpoint device 150(1)-150(N) may be any PCIe device that may have its own registers, memory and an executable command set.

In operation, at boot-up or during run-time, BMC 120 may initiate a challenge-request mechanism to authenticate one or more endpoint devices 150(1)-150(N) by sending a discovery message to an endpoint device requesting that the endpoint device generate a computational value based on parameters included in the discovery message. For example, the BMC 120 may initiate this at run-time when the BMC decides to reconfigure the network such as for hotplug events, PCIe host enumeration, fundamental reset on PCIe bus, and host power state changes. In response to receiving the discovery message from BMC 120, the endpoint device may generate the requested computational value and include the generated value in a response message that it returns to BMC 120. According to an embodiment, the endpoint device may generate the computational value using a predefined hashing algorithm that is known to both BMC 120 and the endpoint device on a challenge-response field included in the discovery message and may sign the generated computational value with a private encryption key. For example, the endpoint device may generate the computational value using Secure Hash Algorithm 2 ("SHA-2") on a 16-bit challenge-response field. Optionally, to increase security, the size of the challenge-response field included in the discovery message may be increased, e.g., to 256 bits.

After receiving the response message from the endpoint device, the BMC 120 may decrypt the signed computational value, using a public encryption key associated with the endpoint device, and compare the computational value generated by the endpoint device with an expected value for the computational value. According to an embodiment, BMC 120 may calculate the expected value for the computational value by using the predefined hashing algorithm known to both BMC 120 and the endpoint device. If the computational value generated by the endpoint device is the same as the expected value for the computational value, the BMC 120 may successfully authenticate the endpoint device. If BMC 120 successfully authenticates the endpoint device, it will send an acknowledgement message to the endpoint device and register the endpoint device in a list of one or more managed devices owned by BMC 120. If, however, BMC is unable to authenticate the endpoint device, the BMC 120 will send a failure message to endpoint device and log the endpoint device is a list of one more devices that are unmanageable. According to an embodiment, BMC 120 may encrypt the acknowledgement message and/or the failure message using a public encryption key associated with the endpoint device, which may decrypt the messages using a private encryption key.

Generally, at boot-up or during run-time, a BMC 120 may initiate discovery of an endpoint device by issuing a control message to the endpoint device requesting that the endpoint device generate and return a computational value based on one or more parameters included in the control message. The control message may further include an identification code that is uniquely associated with BMC 120 and may be encrypted using a public encryption key associated with the endpoint device. Upon receiving the control message, the endpoint device may authenticate the BMC 120 based on the identification code included in the message. If the endpoint device successfully authenticates BMC 120, the endpoint device may generate the requested computational value by using a predefined algorithm known to both BMC 120 and the endpoint device, e.g., a hashing algorithm, sign the computational value with a private encryption key, and include the computational value in a response message that it returns to BMC 120. If, however, the endpoint device does not recognize the identification code included in the challenge message, and is therefore unable to authenticate BMC 120, it may discard the challenge message without responding to it. Optionally, the endpoint device may further log the control message as suspicious if it determines that BMC 120 is not authorized to issue the command.

Upon receiving the response message, BMC 120 decrypts the computational value signed by the endpoint device and compares the computational value with a value that BMC 120 generates using the predefined algorithm. If the computational value generated by the endpoint device is the same as the computational value generated by BMC 120, BMC 120 sends a message to the endpoint device acknowledging that BMC 120 has successfully authenticated the endpoint device and logs itself as being the "owner" of the endpoint device, enabling BMC 120 to issue further commands to the endpoint device 150. If, however, BMC 120 is unable to successfully authenticate the endpoint device, BMC 120 logs endpoint device as being unmanageable. Therefore, to issue one or more commands to the endpoint device, BMC 120 must first initiate a mutual authentication mechanism with endpoint device.

Figure 2:
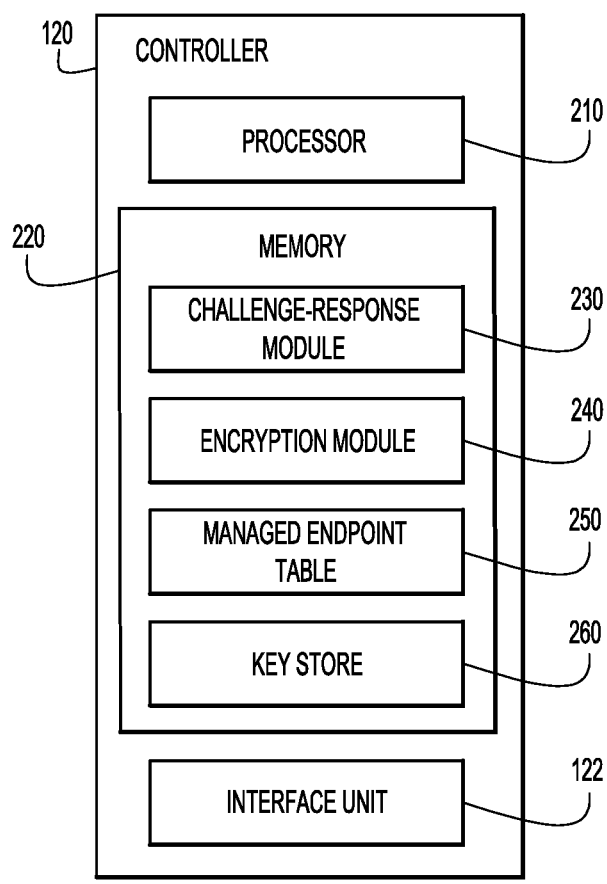
FIG. 2 is a block diagram of a controller configured to participate in the operations of the bus management system, according to an example embodiment.

Reference is now made to FIG. 2, which shows the BMC 120 of FIG. 1 in more detail, according to an embodiment. As shown in FIG. 2, BMC 120 may include one or more processors 210, interface unit 122, and a memory 220 that stores executable software instructions for challenge-response module 230 and encryption module 240, and stores data for managed endpoint table 250 and key store 260. The one or more processors 210 may be a microprocessor or a microcontroller. The memory 220 may include read only memory (ROM), random access memory (RAM), magnetic disk storage media devices, optical storage media devices, flash memory devices, electrical, optical, or other physical/tangible memory storage devices. Thus, in general, memory 220 may include one or more tangible (non-transitory) computer readable storage media (e.g., a memory device) encoded with software comprising computer executable instructions and when the software is executed (e.g., by processor 210) it is operable to perform the operations of the BMC 120 described herein.

Challenge-response module 230 includes instructions for generating challenge messages sent to one or more endpoint devices and for authenticating one or more endpoint devices based on computational values included in response messages received from the one or more endpoint devices. Encryption module 240 includes instructions for encrypting messages and commands sent to one or more endpoint devices and for decrypting response messages received from one or more endpoint devices.

Managed endpoint table 250 may include a list of one or more endpoint devices that BMC 120 has successfully authenticated and, therefore, to which BMC 120 is able to issue one or subsequent control commands. Key store 260 may store public cryptographic keys associated with one or more endpoint devices, enabling BMC 120 to authenticate one or more response messages received from one or more endpoint devices. Key store 260 may further store public and private encryption keys associated with BMC 120. It should be understood that, while FIG. 2 shows them as separate entities, managed endpoint table 250 and key store 260 may be integrated together.

It should be appreciated that the BMC 120, in its entirety or portions thereof, may be implemented in, or be performed by, any suitable programmable device, such as an application specific integrated circuit ("ASIC"), a field-programmable gate array ("FPGA"), or any such immutable device, e.g., a solid-state device having Read-Only Memory ("ROM"), which may be desirable for function as well as cost. For example, the BMC 120 could be part of an existing FPGA used in the computing device (such as a secure boot device).

Figure 3:
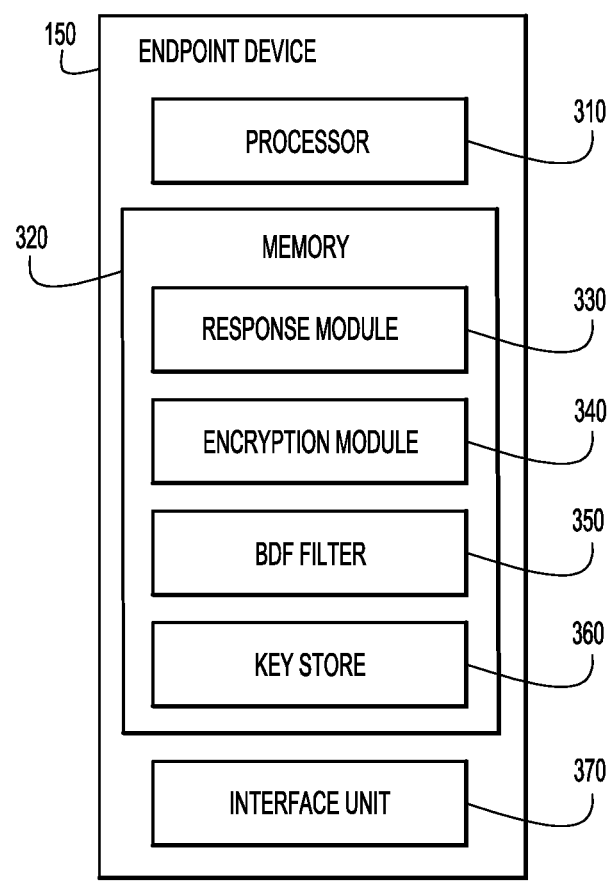
FIG. 3 is a block diagram of an endpoint device configured to participate in the operations of the bus management system, according to an example embodiment.

Reference is now made to FIG. 3, which shows an endpoint device 150 as an example of any of the endpoint devices 150(1)-150(N) shown in FIG. 1, according to an embodiment. As shown in FIG. 3, endpoint device 150 may include one or more processors 310, an interface unit 370, and a memory 320 that stores executable software instructions for response module 330, encryption module 340 and bus-device-function ("BDF") filter 350, and that stores data for key store 360. The one or more processors 310 may be a microprocessor or a microcontroller. The memory 320 may include read only memory (ROM), random access memory (RAM), magnetic disk storage media devices, optical storage media devices, flash memory devices, electrical, optical, or other physical/tangible memory storage devices. Thus, in general, memory 320 may include one or more tangible (non-transitory) computer readable storage media (e.g., a memory device) encoded with software comprising computer executable instructions and when the software is executed (e.g., by processor 310) it is operable to perform the operations of endpoint device 150 described herein.

Response module 330 includes instructions for generating one or more response messages including one or more computational values based on one or parameters included in one or more challenge messages received from BMC 120. Encryption module 340 includes instructions for signing one or more computational values and encrypting response messages including the one or more computational values sent to BMC 120 and for decrypting one or more acknowledgment and/or failure messages received from BMC 120. BDF filter 350 includes instructions for authenticating BMC 120 based on an identification code included in one or more control commands received via interface 370. Key store 360 may store public-private cryptographic key pairs associated with endpoint devices 150, enabling endpoint device 150 to sign and/or encrypt one or more response messages sent to BMC 120. Key store 360 may further store public encryption keys associated with BMC 120.

Figure 4:
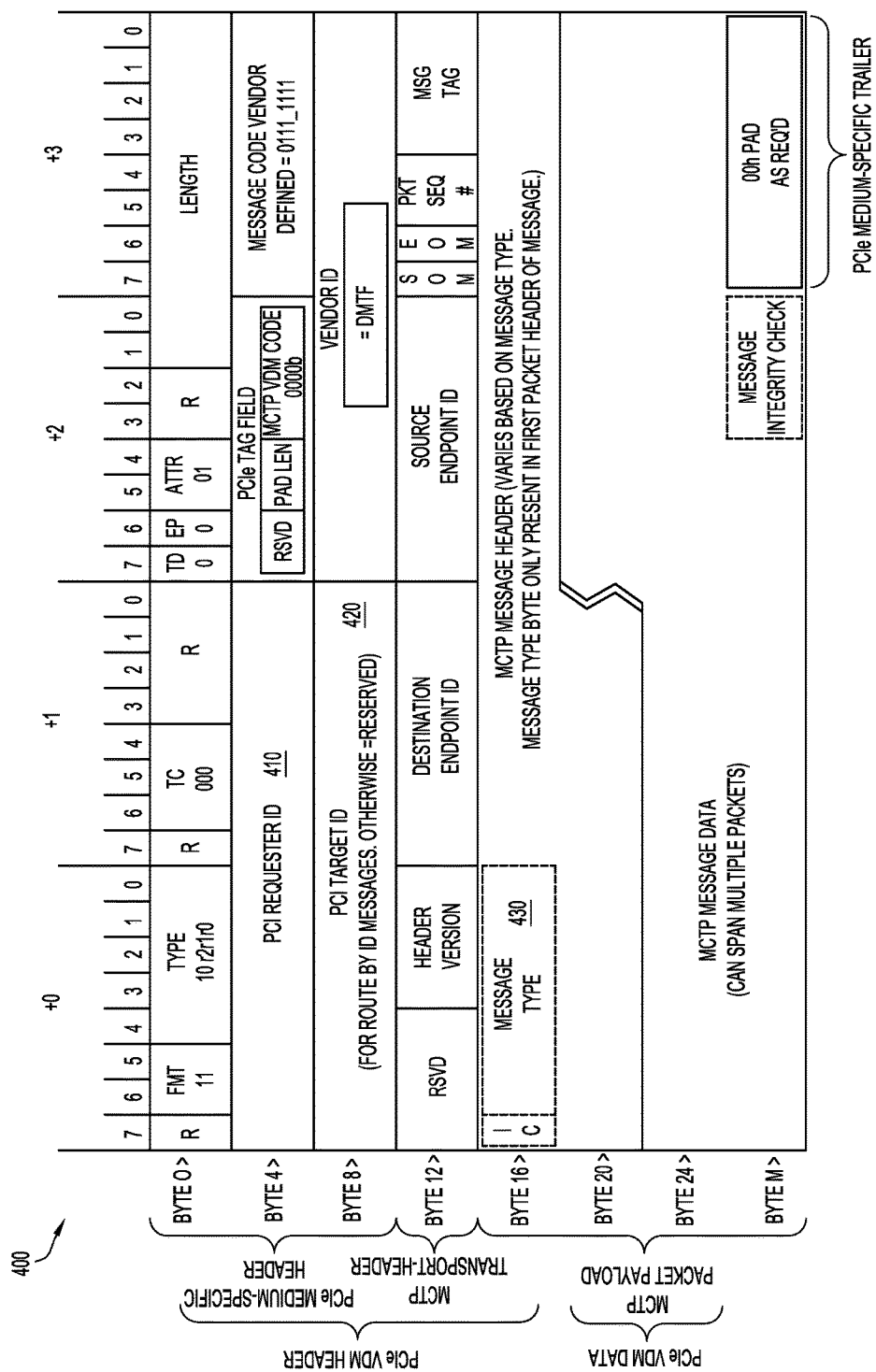
FIG. 4 is a diagram of a Management Component Transport Protocol packet used in the bus management system, according to an example embodiment.

Reference is now made to FIG. 4, a diagram is shown of an example MCTP packet 400, according to an example embodiment. As shown in FIG. 4, MCTP packet 400 may include PCI Requester ID field 410, PCI Target ID field 420, and Message Type field 430. For example, PCI Requester ID field 410 and PCI Target ID field 420 may indicate PCIe cards that may be addressed by using unique BDF addresses that may be assigned by the Basic Input/Output System ("BIOS") when computing device 110 initially boots up. As discussed below, endpoint device 150 may use PCI Requester ID field 410 to identify and filter commands received from BMC 120, and thus, every MCTP packet 400 should have PCI Requester ID field 410 and PCI Target ID field 420 filled out. According to an embodiment, the default for Message Type field 430 is 0x00, but may be reset to be a vendor-defined field that identifies the manufacturer or vendor of BMC 120. As such, endpoint device 150 may use the Message Type field 430 to identify BMC 120 and to filter out control commands that did not originate from BMC 120.

Reference is now made to FIG. 5, a diagram is shown of a list 500 of various message type codes that may be used in Message Type field 430 in the MCTP packet 400 illustrated in FIG. 4, according to an example embodiment. As shown in FIG. 5, Message Type field 430 may indicate that MCTP packet 400 is a MCTP control message (e.g., 0x00), a MCTP data message (e.g., 0x01), or a Network Controller-Sideband Interface ("NC-SI") message (e.g., 0x02). For example, a message type code of 0x00 may indicate that BMC is initiating a discovery of an endpoint device. As discussed above, the default value for Message Type field 430 is 0x00. Message Type field 430 may further indicate the vendor or manufacturer of BMC 220, which endpoint device 150 may use to authenticate that a control message originated from BMC 220. For example, BMC 220 may use Message Type field 430 to authenticate itself to one or more endpoint devices 150 by indicating a vendor-defined PCI message (e.g., 0x7E), or a vendor-defined Internet Assigned Numbers Authority ("IANA") message (e.g., 0x7F). Although the values 0x7E and 0x7F are shown in FIG. 5 as indicating vendor-defined fields, it should be understood that any vendor-defined value may be used in Message Type field 430 to identify a specific vendor or manufacturer of BMC 220.

Figure 6:
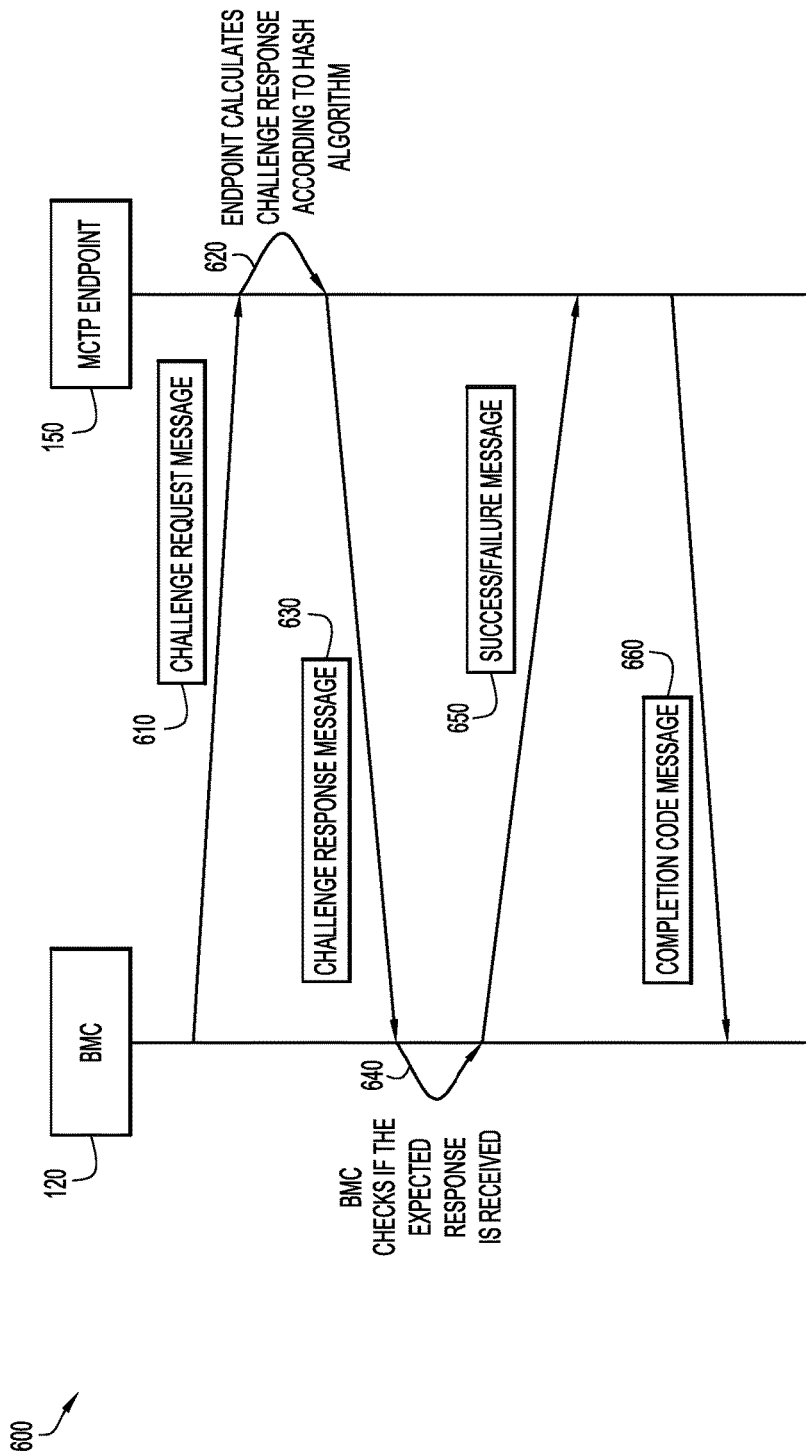
FIG. 6 is a message flow diagram depicting operations of a challenge-response authentication mechanism between a controller and an endpoint device, according to an example embodiment.

With reference to FIG. 6, there is an illustration of communications 600 between BMC 120 and an endpoint device 150 as representative of any the endpoint devices shown in FIG. 1, according to an embodiment. Reference is also made to FIGS. 1-4 for purposes of this description. Initially, at 610, BMC 120 initiates a discovery of endpoint device 150 by transmitting a challenge request message to endpoint device 150. At 620, endpoint device 150 calculates a challenge response message by performing a hashing algorithm on one or more parameters included in the challenge response message to generate a computational value. According to an embodiment, the hashing algorithm is predefined and known to both BMC 120 and endpoint device 150. At 630, endpoint device 150 sends a challenge response message including the generated computational value to BMC 120. At 640, BMC 120 receives the challenge response message from endpoint device 120 and confirms that the response message includes the expected response. For example, BMC 120 may compare the received computational value with an expected response generated by using the predefined hashing algorithm to authenticate the challenge response message. At 650, if the computational value included in the challenge response message equals the generated expected response, BMC 120 sends a success message to endpoint device 150, otherwise, BMC 120 sends a failure message to endpoint device 150. At step 660, if endpoint device 150 received a success message from BMC 120, endpoint device 150 sends a completion code message to BMC 120 acknowledging that endpoint device 150 is a network device owned by BMC 120 and, consequently, endpoint device 150 will receive control commands only from BMC 120.

Figure 7:
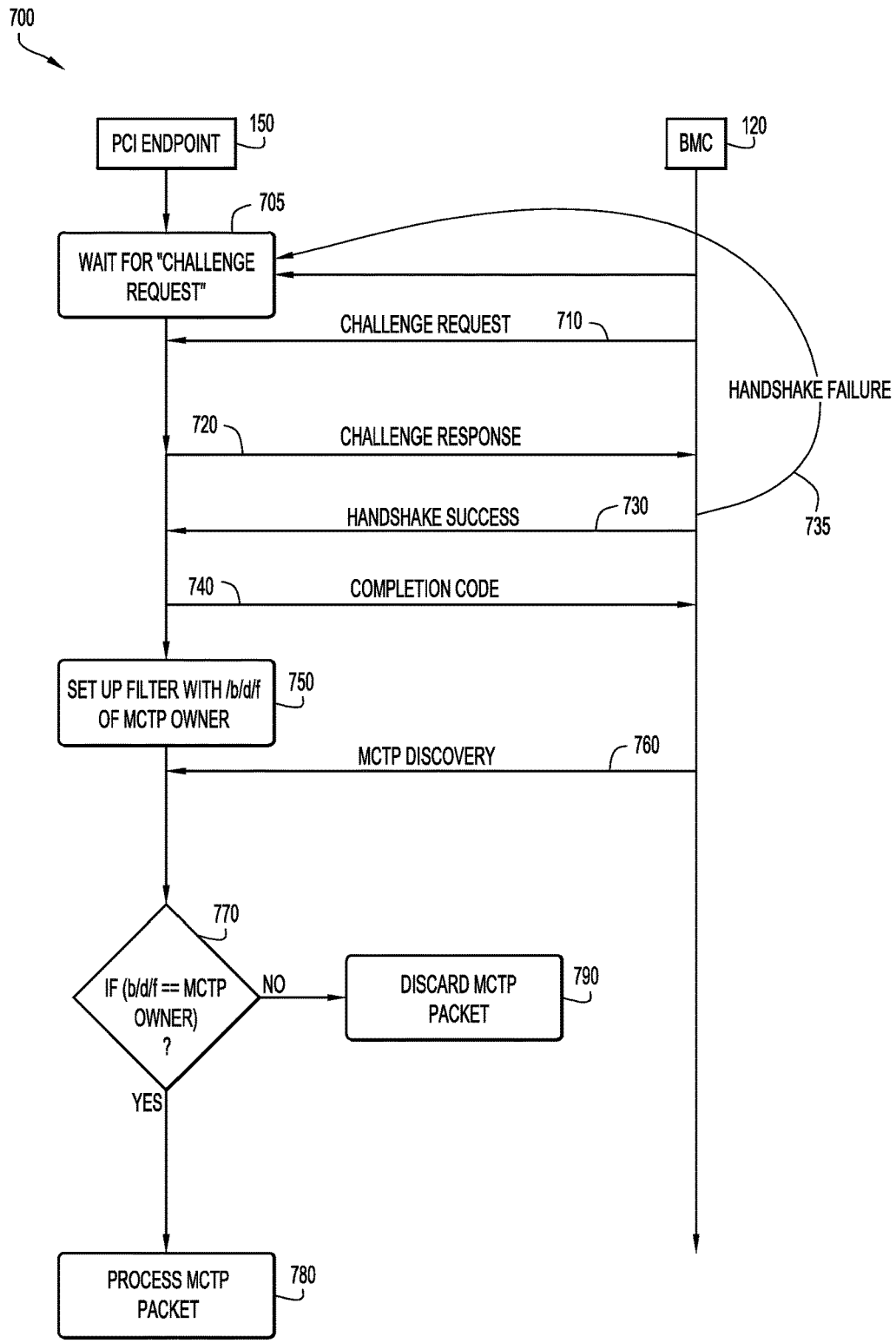
FIG. 7 is a message flow diagram depicting operations of an endpoint device authenticating a controller and processing an MCTP packet, according to an example embodiment.

With reference to FIG. 7, there is an illustration depicting operations 700 of an endpoint device 150 authenticating BMC 120 and processing an MCTP packet, according to an example embodiment. Reference is also made to FIGS. 1-4 for purposes of this description.

Initially, at 705, endpoint device 150 waits to receive a challenge request message from BMC 120. At 710, BMC 120 sends a challenge request message to endpoint device 150. At 720, endpoint device 150 calculates a challenge response message and sends the challenge response message to BMC 120. BMC 120 receives the challenge response message from endpoint device 150 and attempts to authenticate endpoint device 120 by confirming that the response message is equal to the expected response. At 730, if BMC 120 successfully authenticates endpoint device 150, BMC 120 sends a success message to endpoint device 150 acknowledging that device 150 is owned by BMC 120, and operation 700 proceeds to 740. Otherwise, at 735, BMC 120 sends a failure message to endpoint device 150 notifying device 150 that BMC 120 was unable to authenticate endpoint device 150 because the challenge-response handshake has failed, and operations 700 returns to 705.

At 740, endpoint device 150 sends a completion code message to BMC 120 acknowledging that endpoint device 150 is in a network owned by BMC 120 and, consequently, endpoint device 150 will receive control commands only from BMC 120. Accordingly, at 750, endpoint device instantiates BDF filter 350, which blocks all control commands not originating from BMC 120. For example, when instantiated, BDF filter 350 may store an identification code associated with BMC 120 in memory 320 that allows BDF filter 350 to authenticate that one or more control commands originated from BMC 120. According to an embodiment, the identification code associated with BMC 120 may be a PCIe ID assigned to BMC 120 at boot up. According to a further embodiment, the identification code associated with BMC 120 may be a vendor ID code.

At 760, BMC 120 sends an MCTP discovery command to endpoint device 150 including an identification code associated with BMC 120. At 770, BDF filter 350 attempts to authenticate the received MCTP command by comparing the identification code included in the discovery command with the identification code associated BMC 120 stored in memory 320. At 780, if BDF filter 350 successfully authenticates the received MCTP command, endpoint device 150 processes the received MCTP packet, and operations 700 ends. Otherwise, at 790, BDF filter 350 discards the MCTP packet, and operations 700 ends. When BDF filter 350 is unable to authenticate the received MCTP command, endpoint device 150 may log the received command as suspicious, and optionally, alert BMC 120 that an intruder, e.g., another controller, is attempting to take control of endpoint device 150.

Reference is now made to FIG. 8A, a diagram is shown of an example challenge-request message 800 that BMC 120 may generate to authenticate an endpoint device, according to an example embodiment. As shown in FIG. 8A, challenge-request message 800 may include a Vendor ID field, a Hash Version and Data field, and a Challenge String field. The Vendor ID field may include a preconfigured identification code associated with the vendor or manufacturer of BMC 120 and may be 1-2 bytes in length. The Hash Version and Data field may indicate a predefined hashing algorithm that endpoint device 150(N) should apply to the Challenge String field and may further include a hash value that may be optionally passed to the predefined hashing algorithm. The Challenge String field may contain randomly generated data on which endpoint device should perform the predefined hashing algorithm as indicated in the Hash Version and Data field. Although FIG. 8A shows the challenge string as being a 16-byte random number, it should be understood that the challenge string may be of any length. For example, to provide increased security, the length of the challenge string may be increased to 256 bytes. Furthermore, although FIG. 8A shows challenge-request message 800 as being 19 bytes in length, it also should be understood that challenge-request message 800 may be of any length.

Reference is now made to FIG. 8B, a diagram is shown of an example challenge-response message 850 that an endpoint device may return to BMC 120 in response to receiving challenge-request message 800, according to an example embodiment. As shown in FIG. 8B, challenge-response message 850 may include a Vendor ID field and a Challenge Response field. The Vendor ID field may include the preconfigured identification code associated with the vendor or manufacturer of BMC 120 that was included in Challenge-Request message 800. The Challenge Response field may contain a hash of the randomly generated data included in Challenge-Request message 800, which endpoint device may have generated using the predefined hashing algorithm identified in Challenge-Request message 800. According to an embodiment, endpoint device may sign Challenge-Request message with a private encryption key associated with endpoint device 150. Although FIG. 8A shows the challenge response as being a 16-byte random number, it should be understood that the challenge response may be of any length. For example, to provide increased security, the length of the challenge response may be increased to 256 bytes. Furthermore, although FIG. 8A shows challenge-response message 850 as being 18 bytes in length, it also should be understood that challenge-response message 850 may be of any length.

Reference is now made to FIG. 9A, a diagram is shown of an example success message 900 generated by BMC 120 to notify an endpoint device whether BMC 120 was able to authenticate endpoint device, according to an example embodiment. As shown in FIG. 9A, success message 900 may include a Vendor ID field and a Status field. As discussed above, the Vendor ID field may include a preconfigured identification code associated with the vendor or manufacturer of BMC 120 and may be 1-2 bytes in length. The Status field may indicate whether BMC 120 was able to successfully authenticate endpoint device using the challenge-response handshake. For example, the value of the sixteenth byte of the Status field may be 0x00, indicating success, or may be 0x0F, indicating failure. As further shown in FIG. 9A, the Status field may also include the challenge response previously received from endpoint device. Although FIG. 9A shows success message 900 as being 18 bytes in length, it should be understood that success message 900 may be of any length.

Reference is now made to FIG. 9B, a diagram is shown of an example completion message 950 that an endpoint device may generate to notify BMC 120 that endpoint device has received the success message sent by BMC 120, according to an embodiment. As shown in FIG. 9B, completion message 950 may include a Vendor ID field and a Completion Code field. As explained above, the Vendor ID field may include a preconfigured identification code received in the success message 900 previously sent by BMC 120 and may be 1-2 bytes in length. The Completion Code field may notify BMC 120 that endpoint device received the success message by indicating that it will instantiate BDF filter 350. For example, a value of 0x00 in the Completion Code field may indicate that the endpoint device will initialize BDF filter 350 with an identification code associated with BMC 120 to authenticate and filter subsequently received commands. As further shown in FIG. 9B, if the endpoint device fails to indicate a value of 0x00 in the Completion Code field, BMC 120 will identify endpoint device as being unmanageable and will not register the endpoint device as being part of its network. Although FIG. 9B shows completion message 950 as being 3 bytes in length, it should be understood that completion message 950 may be of any length.

Figure 10:
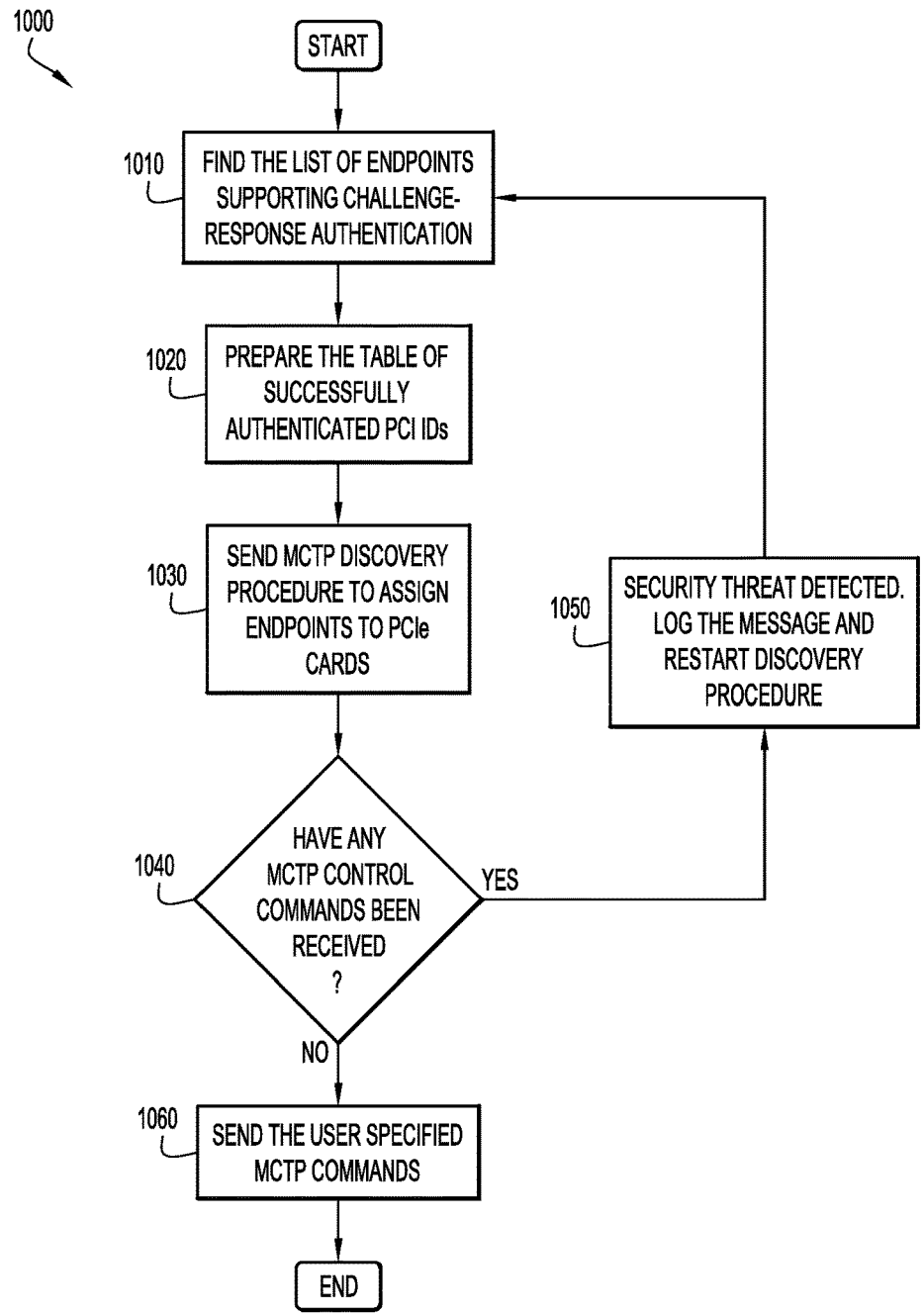
FIG. 10 is a flowchart depicting operations performed by a controller to monitor and authorize commands on an internal bus, according to an example embodiment.

With reference to FIG. 10 and continued reference to FIGS. 1-7, 8A, 8B, 9A and 9B, a flowchart is shown of a process 1000 performed by BMC 120 to monitor and issue commands directed to an endpoint device on an internal bus, according to an example embodiment.

At 1010, BMC 120 identifies a list of one or more endpoint devices that are capable of supporting a challenge-response authentication mechanism. For example, BMC 120 may include in the list one or more endpoint devices that previously completed a challenge-response handshake with BMC 120. At 1020, based on the identified list of one or more endpoint devices, BMC 120 prepares a table of successfully authenticated devices, and, at 1030, sends a discovery message to each of the one or more endpoint devices in the table notifying the one or more endpoint devices that they are assigned to BMC 120.

At 1040, BMC 120 monitors an internal bus to determine whether one or more endpoint devices has received one or more unauthorized MCTPMCTP control commands, and, if not, operations proceed to 1060. For example, because PCIe is a broadcast protocol, BMC 120 will receive any MCTP-MCTP command that is placed on an internal bus and directed to an endpoint device. Accordingly, at 1050, if BMC 120 determines that one or more authenticated endpoint devices has received one or more unauthorized MCTP-MCTP control commands, BMC 120 logs the one or more unauthorized control commands as a security threat and operations return to 1010 to restart the discovery procedure.

At 1060, BMC sends the endpoint device one or more MCTP commands for processing, and process 1000 ends.

Figure 11:
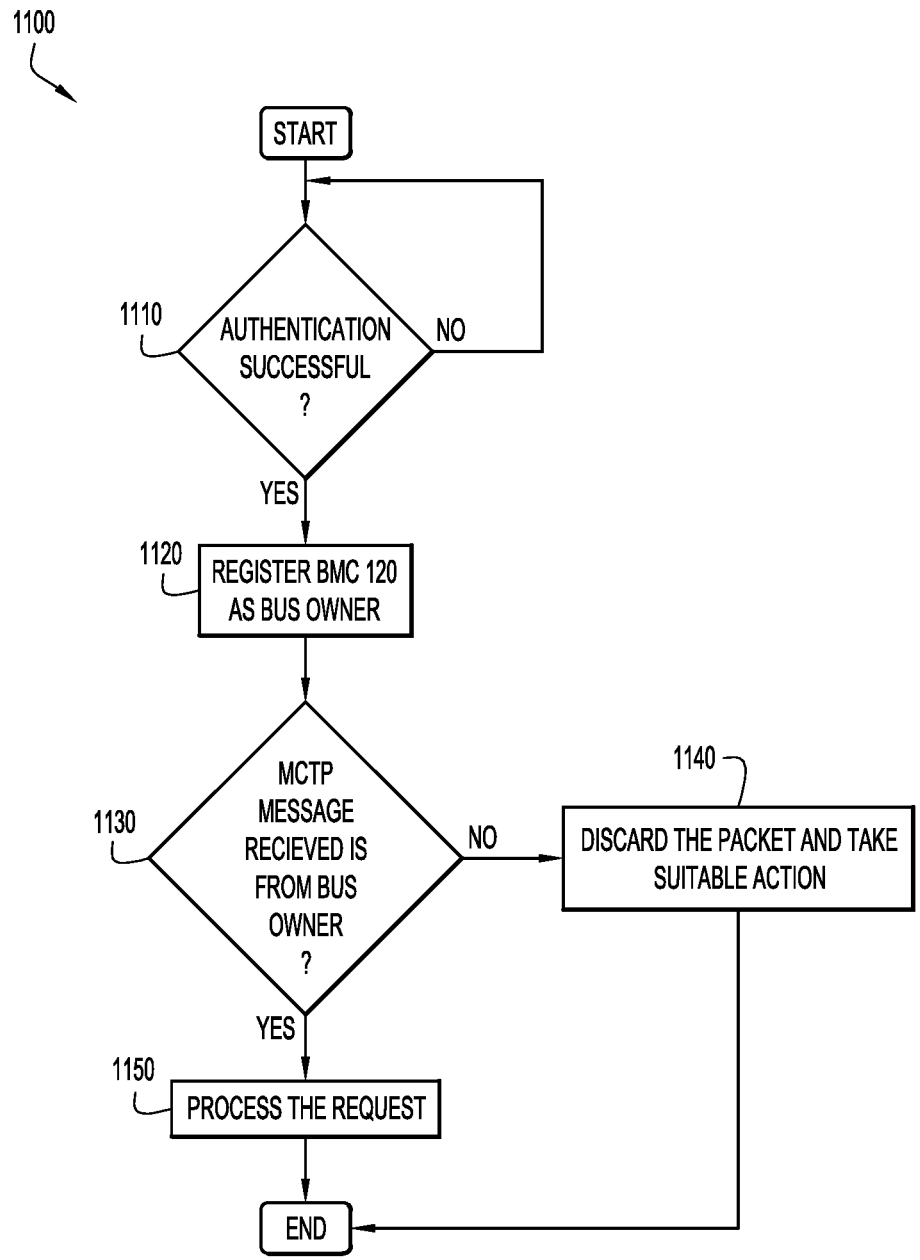
FIG. 11 is a flowchart depicting operations performed by an endpoint device to authenticate and process commands on an internal bus, according to an example embodiment.

With reference to FIG. 11 and continued reference to FIGS. 1-7, 8A, 8B, 9A and 9B, a flowchart is shown of a process 1100 performed by an endpoint device to authenticate one or more received MCTP commands, according to an example embodiment.

At 1110, endpoint device determines whether an authentication challenge-response handshake was successful, and, if so, operations proceed to 1120. Otherwise, endpoint devices waits to receive a subsequent challenge-response message and operations return to 1110.

At 1120, endpoint device registers BMC 120 as the bus owner, causing endpoint device to receive one or more commands from only BMC 120. For example, endpoint device may register the PCI ID assigned to BMC 120 as the bus owner of the network to which it belongs.

At 1130, endpoint device receives an MCTPMCTP control command and determines whether the requestor ID included in the MCTPMCTP control command is associated with BMC 120, and, if so, operations proceed to 1150. Otherwise, at 1140, endpoint device discards the received command and takes suitable action. For example, endpoint device may logs the received command as a security threat and alert BMC 120.

At 1150, endpoint device processes the received MCTP-MCTP command, and process 1100 ends.

Figure 12:
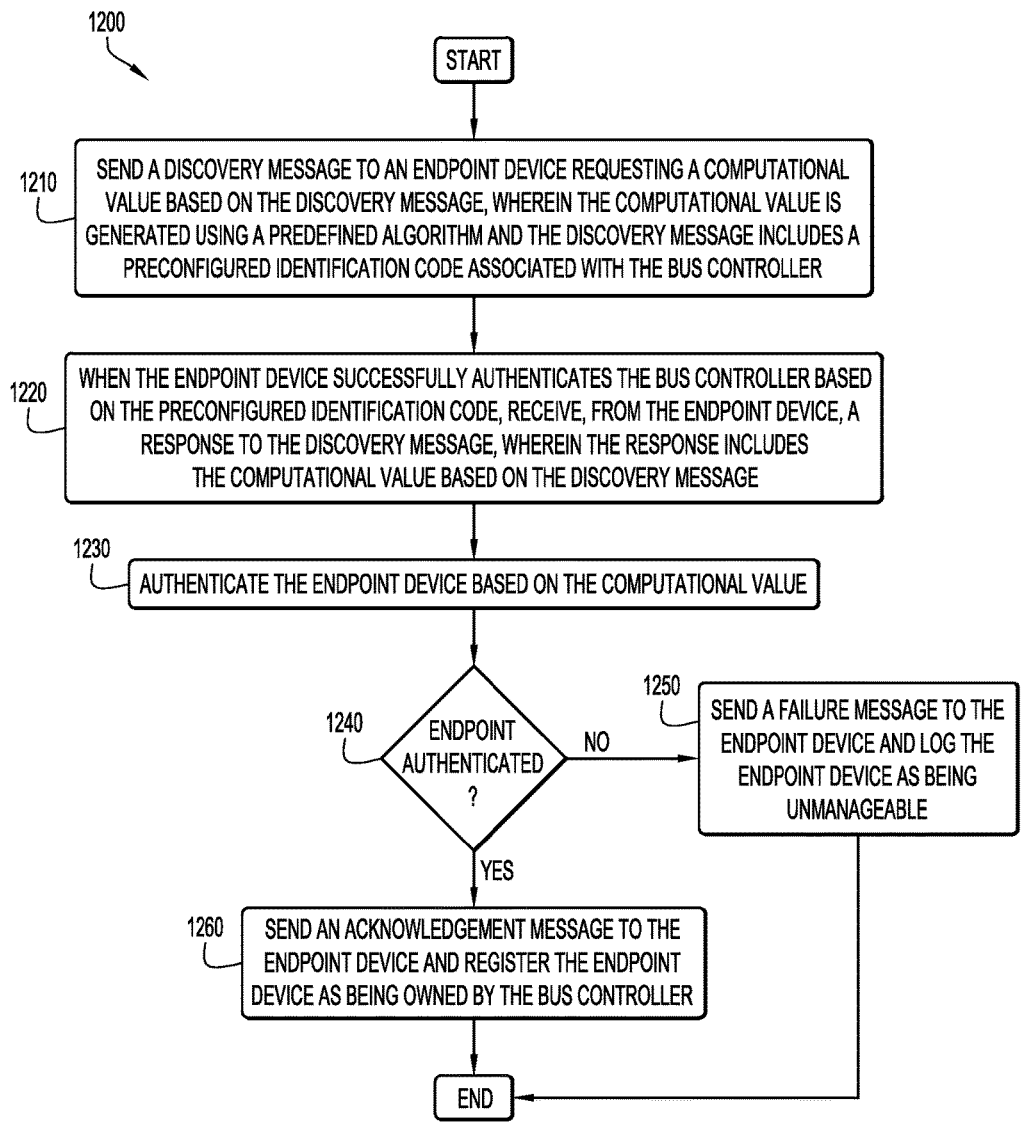
FIG. 12 is a flowchart depicting operations performed by a controller to monitor and authorize commands on an internal bus, according to an example embodiment.

With reference to FIG. 12 and continued reference to FIGS. 1-7, 8A, 8B, 9A and 9B, a flowchart is shown of a process 1200 performed by BMC 120 to authenticate and register one or more endpoint devices, according to an example embodiment.

At 1210, BMC 120 sends a discovery message to an endpoint device requesting a computational value based on the discovery message, wherein the computational value is generated using a predefined algorithm and the discovery message includes a preconfigured identification code associated with BMC 120.

At 1220, when endpoint device successfully authenticates BMC 120 based on the preconfigured identification code, BMC 120 receives, from endpoint device, a response to the discovery message, wherein the response includes the computational value based on the discovery message At 1230, BMC 120 attempts to authenticate the endpoint device based on the computational value included in the response to the discovery message.

At 1240, BMC 120 determines whether endpoint device was successfully authenticated, and, if so, operations proceed to 1260. Otherwise, at 1250, BMC 120 sends a failure message to endpoint device and logs endpoint device as being unmanageable, and process 1200 ends.

At 1260, BMC 120 sends an acknowledgement message to endpoint device and registers endpoint device as being owned by BMC 120, and process 1200 ends.

Figure 13:
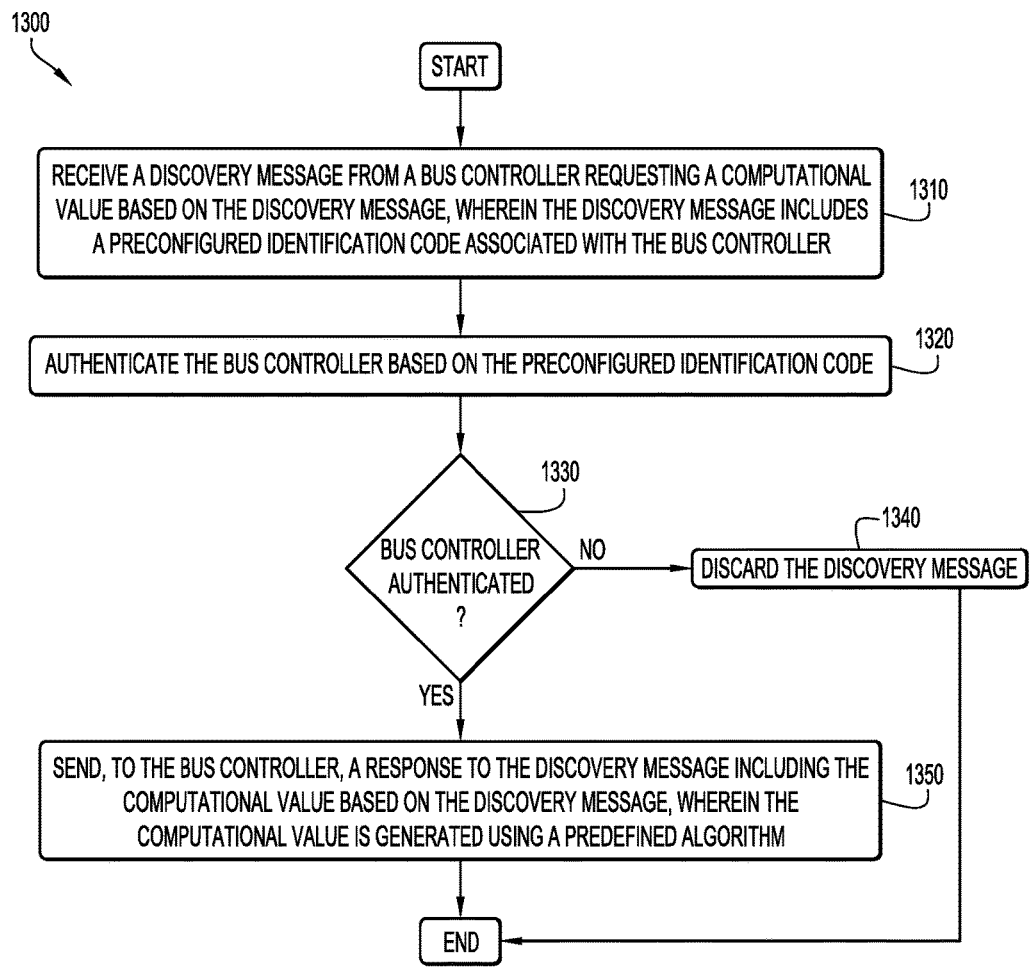
FIG. 13 is a flowchart depicting operations performed by an endpoint device to authenticate and process commands on an internal bus, according to an example embodiment.

With reference to FIG. 13 and continued reference to FIGS. 1-7, 8A, 8B, 9A and 9B, a flowchart is shown of a process 1300 performed by endpoint device to authenticate BMC 120, according to an example embodiment.

At 1310, endpoint device receives a discovery message from BMC 120 requesting a computational value based on the discovery message, wherein the discovery message includes a preconfigured identification code associated with BMC 120.

At 1320, endpoint device authenticates BMC 120 based on the preconfigured identification code included in the discovery message.

At 1330, endpoint device determines whether BMC 120 was successfully authenticated, and, if so, operations proceed to 1350. Otherwise, at 1340, endpoint device discards the discovery message, and process 1300 ends. Optionally, endpoint device 150(N) may send a signal to external intrusion detection system indicating that it received a command message from an unauthenticated device.

At 1350, endpoint device sends to BMC 120 a response to the discovery message including the computational value based on the discovery message, wherein the computational value is generated using a predefined algorithm, and process 1300 ends The embodiments presented herein allow a controller to take ownership of an internal bus and form a network, e.g., at boot up, by authenticating one or more endpoint devices connected to the bus. In so doing, the embodiments disclosed herein also allow a controller to monitor an internal bus to detect unauthorized commands issued to the one or more endpoint devices. For example, because PCIe is a broadcast protocol, after forming the network of one or more endpoint devices, the controller may receive any control commands placed on the bus directed to the one or more endpoint devices and take any necessary appropriate security measures.

The embodiments presented herein further allow an endpoint device to authenticate a bus controller from which it has received a control command before the endpoint device will process the command. As such, because the endpoint device will accept commands from only an authenticated bus owner, the embodiments disclosed herein provide a secure method wherein one or more endpoints registered to a specific controller will discard any received command packets that were not originated by that controller and, optionally, notify the controller of the suspicious command packets. In this manner, the embodiments disclosed herein provide an efficient intrusion detection system while preventing an intruder from gaining control of an internal bus and reforming a network of one or more endpoints connected to the bus.

Advantages of the embodiments include providing an additional layer of security to control/restrict the ability of third parties to maliciously attack a computing device by gaining control of an internal bus and one or more endpoint devices connected to the bus. In certain deployments, such as government and financial institutions, there is a requirement that computing devices provide secure and continuous services. Thus, the bus management system may be deployed in certain environments where this additional layer of security is desired. According to embodiments presented herein, a controller may only issue one or more commands to one or more endpoint devices connected to an internal bus if the controller has successfully authenticated and registered the one or more endpoint devices and the one or more endpoint devices have successfully authenticated the controller. In so doing, the one or more endpoint devices described herein may verify that a controller is authorized to issue one or more commands before executing the commands, and the controller is able to detect whether any unauthorized commands have been issued to the one or more endpoint devices, preventing a malicious attacker from damaging, destroying or even taking control over the computing device.

In one form, a method is provided comprising: at a bus controller that is in communication with an endpoint device over an internal bus: sending a discovery message to the endpoint device requesting a computational value based on the discovery message, wherein the computational value is generated by the endpoint device using a predefined algorithm and the discovery message includes a preconfigured identification code associated with the bus controller; receiving, from the endpoint device, a response to the discovery message, wherein the response includes the computational value based on the discovery message when the endpoint device successfully authenticates the bus controller based on the preconfigured identification code; authenticating the endpoint device based on the computational value; if the endpoint device is successfully authenticated, sending an acknowledgment message to the endpoint device and registering the endpoint device as being owned by the bus controller; and if the endpoint device is not successfully authenticated, sending a failure message to the endpoint device and logging the endpoint device as being unmanageable by the bus controller.

In another form, a method is provided comprising: at an endpoint device in communication with a bus controller over an internal bus: receiving from the bus controller a discovery message requesting a computational value based on the discovery message, wherein the discovery message includes a preconfigured identification code associated with the bus controller; authenticating the bus controller based on the preconfigured identification code; if the bus controller is successfully authenticated, sending to the bus controller, a response to the discovery message including the computational value based on the discovery message, wherein the computational value is generated using a predefined algorithm; and if the endpoint device is not successfully authenticated, discarding the discovery message.

In yet another form, a non-transitory computer readable storage media is provided storing executable instructions that are operable in a computing device, to perform operations to: send a discovery message to an endpoint device requesting a computational value based on the discovery message, wherein the computational value is generated by the endpoint device using a predefined algorithm and the discovery message includes a preconfigured identification code associated with a bus controller; receive, from the endpoint device, a response to the discovery message, wherein the response includes the computational value based on the discovery message when the endpoint device successfully authenticates the bus controller based on the preconfigured identification code; authenticate the endpoint device based on the computational value; if the endpoint device is successfully authenticated, send an acknowledgment message to the endpoint device and register the endpoint device as being owned by the bus controller; and if the endpoint device is not successfully authenticated, send a failure message to the endpoint device and log the endpoint device as being unmanageable by the bus controller.

In still another form, an apparatus is provided that includes a processor, an internal bus that is in communication with an endpoint device bus, wherein on behalf of a bus controller, the processor is configured to: send to the endpoint device a discovery message requesting a computational value based on the discovery message, wherein the computational value is generated by the endpoint device using a predefined algorithm and the discovery message includes a preconfigured identification code associated with the bus controller; receive, from the endpoint device, a response to the discovery message, wherein the response includes the computational value based on the discovery message when the endpoint device successfully authenticates the bus controller based on the preconfigured identification code; authenticate the endpoint device based on the computational value; if the endpoint device is successfully authenticated, send an acknowledgment message to the endpoint device and registering the endpoint device as being owned by the bus controller; and if the endpoint device is not successfully authenticated, send a failure message to the endpoint device and logging the endpoint device as being unmanageable by the bus controller.

In yet another form, an apparatus is provided comprising a processor, and an internal bus, wherein a bus controller is in communication with the apparatus over the internal bus, and wherein the processor is configured to: receive from the bus controller a discovery message requesting a computational value based on the discovery message, wherein the discovery message includes a preconfigured identification code associated with the bus controller; authenticate the bus controller based on the preconfigured identification code; if the bus controller is successfully authenticated, send to the bus controller, a response to the discovery message including the computational value based on the discovery message, wherein the computational value is generated using a predefined algorithm; and if the bus controller is not successfully authenticated, discard the discovery message.

In still another form, a non-transitory computer readable storage media is provided storing executable instructions that are operable in a computing device, to perform operations to: receive from a bus controller a discovery message requesting a computational value based on the discovery message, wherein the discovery message includes a preconfigured identification code associated with the bus controller; authenticate the bus controller based on the preconfigured identification code; if the bus controller is successfully authenticated, send to the bus controller, a response to the discovery message including the computational value based on the discovery message, wherein the computational value is generated using a predefined algorithm; and if the bus controller is not successfully authenticated, discard the discovery message.

The above description is intended by way of example only. Various modifications and structural changes may be made therein without departing from the scope of the concepts described herein and within the scope and range of equivalents of the claims.

What is claimed is:

1. A method comprising:
   at a bus controller that is in communication with an endpoint device over an internal bus:
   sending to the endpoint device a discovery message requesting a computational value based on the discovery message, wherein the computational value is generated by the endpoint device using a predefined algorithm and the discovery message includes a preconfigured identification code associated with the bus controller;
   receiving, from the endpoint device, a response to the discovery message, wherein the response includes the computational value based on the discovery message when the endpoint device successfully authenticates the bus controller based on the preconfigured identification code;
   authenticating the endpoint device based on the computational value, wherein authenticating the endpoint device includes:
     determining whether the computational value based on the discovery message and generated by the endpoint device using the predefined algorithm equals a computational value based on the discovery message and generated by the bus controller using the predefined algorithm; and
     classifying the endpoint device as being authenticated when the computational value generated by the endpoint device using the predefined algorithm is the same as the computational value generated by the bus controller using the predefined algorithm;
   if the endpoint device is successfully authenticated, sending an acknowledgment message to the endpoint device and registering the endpoint device as being owned by the bus controller; and
   if the endpoint device is not successfully authenticated, sending a failure message to the endpoint device and logging the endpoint device as being unmanageable by the bus controller.

2. The method of claim 1, wherein the preconfigured identification code is associated with an entity that manufactured the bus controller.

3. The method of claim 1, further comprising:
   monitoring the internal bus to detect whether any control commands are sent to the endpoint device; and
   if a control command is detected, logging the control command as unauthorized and sending a further discovery message to the endpoint device.

4. The method of claim 3, further comprising sending an alert to an intrusion detection system if an unauthorized control command is detected.

5. The method of claim 3, further comprising:
   if no unauthorized control command is detected, sending an operational command to the endpoint device.

6. The method of claim 5, wherein the operational command is a Management Component Transport Protocol command.

7. The method of claim 6, wherein the Management Component Transport Protocol command is defined by an entity that manufactured the bus controller.

8. The method of claim 1, wherein the internal bus is a Peripheral Component Interconnect Express ("PCIe") bus.

9. The method of claim 1, wherein the preconfigured identification code is permanently stored in a memory of the bus controller by an entity that manufactured the bus controller.

10. The method of claim 1, wherein the predefined algorithm is a hash algorithm.

11. A method comprising:
    at an endpoint device in communication with a bus controller over an internal bus:
    receiving from the bus controller a discovery message requesting a computational value based on the discovery message, wherein the discovery message includes a preconfigured identifier associated with the bus controller;
    authenticating the bus controller based on an operational command received from the bus controller and on the preconfigured identification code, wherein authenticating includes determining whether an identifier associated with the operational command is the same as the preconfigured identifier associated with the bus controller registered as the owner of the internal bus, and when it is determined that the identifier associated with the operational command is the same as the preconfigured identifier associated with the bus controller, classifying the operational command as being authenticated;

if the bus controller is successfully authenticated, sending to the bus controller, a response message to the discovery message, the response message including the computational value based on the discovery message, wherein the computational value is generated using a predefined algorithm; and if the bus controller is not successfully authenticated, discarding the discovery message.

12. The method of claim 11, further comprising:

receiving an acknowledgement message from the bus controller; and if the acknowledgement indicates that the response message was successfully authenticated, sending a completion message to the bus controller and registering the bus controller as an owner of the internal bus.

13. The method of claim 12, further comprising:

if the operational command is successfully authenticated, executing the command, otherwise, blocking the operational command.

14. The method of claim 13, wherein blocking the operational command further comprises logging the operational command as being suspicious.

15. The method of claim 14, further comprising:

sending an alert to the bus controller registered as the owner of the internal bus.

16. A non-transitory computer readable storage media storing executable instructions that are operable in a computing device, to perform operations to:

send a discovery message to an endpoint device requesting a computational value based on the discovery message, wherein the computational value is generated by the endpoint device using a predefined algorithm and the discovery message includes a preconfigured identification code associated with a bus controller;

receive, from the endpoint device, a response to the discovery message, wherein the response includes the computational value based on the discovery message when the endpoint device successfully authenticates the bus controller based on the preconfigured identification code;

authenticate the endpoint device based on the computational value by:

determining whether the computational value based on the discovery message and generated by the endpoint device using the predefined algorithm equals a computational value based on the discovery message and generated by the bus controller using the predefined algorithm; and classifying the endpoint device as being authenticated when the computational value generated by the endpoint device using the predefined algorithm is the same as the computational value generated by the bus controller using the predefined algorithm;

if the endpoint device is successfully authenticated, send an acknowledgment message to the endpoint device and register the endpoint device as being owned by the bus controller; and if the endpoint device is not successfully authenticated, send a failure message to the endpoint device and log the endpoint device as being unmanageable by the bus controller.

17. The non-transitory computer readable storage media of claim 16, wherein the executable instructions are operable to further perform operations to:

monitor the internal bus to detect whether any control commands are sent to the endpoint device; and if a control command is detected, log the control command as unauthorized and send a further discovery message to the endpoint device.

18. The non-transitory computer readable storage media of claim 17, further comprising instructions that are operable to send an alert to an intrusion detection system if an unauthorized control command is detected.

19. The non-transitory computer readable storage media of claim 17, further comprising instructions that are operable to:

if no unauthorized control command is detected, send an operational command to the endpoint device.

20. The non-transitory computer readable storage media of claim 16, wherein the preconfigured identification code is associated with an entity that manufactured the bus controller.

\* \* \* \* \*